(12) United States Patent
Lee et al.

(10) Patent No.: US 8,607,914 B2
(45) Date of Patent: Dec. 17, 2013

(54) REAR SUSPENSION FOR THREE-WHEELED CAR

(75) Inventors: Sang-Hoon Lee, Yongin-shi (KR); Jae-Kil Lee, Suwon-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/489,705

(22) Filed: Jun. 6, 2012

(65) Prior Publication Data
US 2013/0119629 A1   May 16, 2013

(30) Foreign Application Priority Data

Nov. 11, 2011   (KR) .................. 10-2011-0117473
Dec. 12, 2011   (KR) .................. 10-2011-0132760

(51) Int. Cl.
*B62D 61/06*   (2006.01)

(52) U.S. Cl.
USPC .... 180/211; 180/210; 280/93.504; 280/137.5

(58) Field of Classification Search
USPC ................. 180/210, 211; 280/93.504, 137.5
See application file for complete search history.

(56) References Cited

U.S. PATENT DOCUMENTS

| | | | | |
|---|---|---|---|---|
| 776,561 | A * | 12/1904 | Steinhauer | 180/6.34 |
| 1,074,748 | A * | 10/1913 | Satterlee | 280/92 |
| 2,260,102 | A * | 10/1941 | Freret | 280/5.509 |
| 5,431,243 | A * | 7/1995 | Richards | 180/211 |
| 5,890,558 | A * | 4/1999 | Keegan | 180/211 |
| 6,367,831 | B1 * | 4/2002 | Lim et al. | 280/124.102 |
| 6,883,629 | B2 * | 4/2005 | Hanagan | 180/211 |
| 7,073,806 | B2 * | 7/2006 | Bagnoli | 280/267 |
| 7,641,207 | B2 * | 1/2010 | Yang | 280/124.103 |
| 7,648,148 | B1 * | 1/2010 | Mercier | 280/124.103 |
| 7,921,955 | B2 * | 4/2011 | Spangler | 180/210 |
| 7,967,306 | B2 * | 6/2011 | Mighell | 280/124.103 |
| 8,123,240 | B2 * | 2/2012 | Mercier | 280/124.103 |
| 8,172,014 | B2 * | 5/2012 | Brown et al. | 180/22 |
| 8,249,775 | B2 * | 8/2012 | Van Den Brink | 701/38 |
| 2002/0148663 | A1 * | 10/2002 | Chang | 180/210 |
| 2002/0148664 | A1 * | 10/2002 | Hanagan et al. | 180/210 |
| 2003/0102176 | A1 * | 6/2003 | Bautista | 180/210 |
| 2003/0132047 | A1 * | 7/2003 | Gaffney et al. | 180/210 |
| 2004/0000442 | A1 * | 1/2004 | Jeng | 180/210 |
| 2004/0035627 | A1 * | 2/2004 | Richey et al. | 180/210 |
| 2004/0040769 | A1 * | 3/2004 | Richey et al. | 180/210 |
| 2004/0051269 | A1 * | 3/2004 | Bouton | 280/124.103 |
| 2006/0054370 | A1 * | 3/2006 | Sugioka et al. | 180/211 |

(Continued)

FOREIGN PATENT DOCUMENTS

DE   3546073 A1 *   7/1987   ........... B62K 5/02
JP   2006-62573 A   3/2006

(Continued)

*Primary Examiner* — Nicole Verley
(74) *Attorney, Agent, or Firm* — Morgan, Lewis & Bockius LLP

(57) ABSTRACT

A rear suspension of a three-wheeled car with two front wheels and one rear wheel installed in the car body frame may include a pair of roll links that may be connected to the front wheels and twists as the car turns, and a roll connector that pivots around a shaft as the roll links twist, and a knuckle assembly, which may be joined to a rear wheel, installed in the rear end of the car body frame, and connected to a roll connector so that it turns left and right as the roll connector turns, wherein the knuckle assembly turns in the same direction the front wheels turn.

8 Claims, 11 Drawing Sheets

(56) References Cited

U.S. PATENT DOCUMENTS

| | | |
|---|---|---|
| 2007/0045022 A1* | 3/2007 | Greig et al. .................. 180/215 |
| 2008/0164085 A1* | 7/2008 | Cecinini ...................... 180/210 |
| 2009/0205894 A1* | 8/2009 | Eaton .......................... 180/210 |
| 2011/0035113 A1 | 2/2011 | Yanagi |
| 2012/0181765 A1* | 7/2012 | Hill et al. ..................... 280/62 |
| 2012/0232758 A1* | 9/2012 | Mercier ........................ 701/41 |

FOREIGN PATENT DOCUMENTS

| | | |
|---|---|---|
| JP | 2011-116269 A | 6/2011 |
| KR | 10-2009-0130020 A | 12/2009 |
| WO | WO 87/02951 A1 | 5/1987 |

* cited by examiner

<When moving forward>

<When turning left>

< When Moving Forward >

< When Turning Left >

REAR SUSPENSION FOR THREE-WHEELED CAR

CROSS-REFERENCE TO RELATED APPLICATION

The present application claims priority to Korean Patent Application No. 10-2011-0117473, filed on Nov. 11, 2011 and to Korean Patent Application No. 10-2011-0132760, filed on Dec. 12, 2011, the entire contents of which is incorporated herein for all purposes by this reference.

BACKGROUND OF THE INVENTION

1. Field of the Invention

The present invention relates to a rear suspension for a three-wheeled car, and more particularly, to a rear suspension for a three-wheeled car, which comprises two front wheels and one rear wheel, in which the steering in the rear wheel is automatically adjusted by the tow angle and camber angle, which are adjusted by the direction the car is turning so that the stability is enhanced when the car is turning.

2. Description of Related Art

Currently, the efforts to improve the fuel efficiency of a car are being made continuously and globally. As a part of making such efforts, the studies on improving the performance of a power-train and on reducing the weight of a car continue to be conducted.

In furtherance of this idea, a three-wheeled car has been newly developed as a more environment-friendly transportation means and as a lighter vehicle.

As mentioned above, a three-wheeled car developed with the environment-friendly and the lighter-weight concept has a structure of either one front wheel with two rear wheels triangle structure or one rear wheel with two front wheels inverted triangle structure. Compared to a four-wheeled vehicle, a three-wheeled car has the advantage of being lighter and more fuel-efficient, and yet, it has the disadvantage of having less stability while on the road.

Of the above-mentioned two types of three-wheeled cars, a swing-arm type was used mainly for a traditional rear suspension applied to a three-wheeled car with two front wheels and one rear wheel which was usually applied in the rear wheel of a motorcycle and only allowed the up-and-down motion.

In reference to FIG. 1, the traditional suspension structure of a three-wheeled car with two front wheels and one rear wheel is designed so that a H-shaped arm is connected to the rear end of the car body frame through a hinge pin to perform hinge movements up-and-down pivot movements and the impact be buffered by the bump and rebound movement of the damping strut not depicted in the drawings.

Compared with a four-wheeled car, a three-wheeled car with one rear wheel has half the cornering force, supposing they are both equipped with identical tires. Therefore, when turning an identical corner, a three-wheeled car has a greater chance of a spin-out because its lateral force the resilience against the force applied laterally as a car turns a corner in the rear wheel is smaller than that in the rear wheels of a four-wheeled car. In other words, there was the problem of diminished stability when a three-wheeled car is turning.

Also, the swing-arm type suspension structure had a tendency for a toe-out when the lateral force is applied, due to the compliance effect the effect as though the handle is being steered when the external forces change the forms of rubber bushes for suspension and hence change the alignment.

Thus, the stability of a car when it is turning is significantly reduced if it uses a swing-arm type suspension such as the one described above due to the centrifugal force and the lateral force which induce the over-steer moment. Hence, there is the problem of a rear wheel breaking away from the right track and the stability of a car decreasing when a car is on the road.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear suspension of a three-wheeled car with greater stability when the car is turning, by inducing the changes in the toe angle and the camber angle of the rear wheel forcibly when the car is turning.

In an aspect of the present invention, a rear suspension of a three-wheeled car with two front wheels and one rear wheel installed in a car body frame, may include roll links pivotally mounted to the car body frame, wherein an end of each roll link is connected to each front wheel respectively, such that a twisting occurs to the roll links as the car turns, a roll connector, to which another end of the each roll link is pivotally connected, wherein the roll connector pivotally rotates about a longitudinal axis thereof, when the twisting of the roll links occurs, and a knuckle assembly pivotally coupled to the rear wheel and to a rear end of the car body frame, wherein the knuckle assembly is rotatably engaged to the roll connector through the rear end of the car body frame so that the knuckle assembly moves left and right with respect to the car body frame while the roll connector turns, wherein the knuckle assembly turns in the same direction as the front wheels turn.

The rear suspension of the three-wheeled car may further include a link bar, a middle portion thereof being fixed to the roller connector and both ends thereof being pivotally coupled to the another end of each roll link.

The roll connector is engaged to a roll shaft, wherein a first bevel gear is formed to an end of the roll shaft, and wherein a second bevel gear, which meshes with the first bevel gear, is installed in an upper portion of the knuckle assembly that is rotatably coupled to the car body frame.

The knuckle assembly may include a fork arm, to which a rotation shaft of the rear wheel is rotatably mounted, and a rotation supporting member pivotally mounted to the rear end of the car body frame such that the rotation supporting member turns left or right, wherein an end of the fork arm is pivotally joined to the rotation supporting member through a hinge shaft so that the fork arm pivots around the hinge shaft, and wherein the second bevel gear is formed to an upper portion of the rotation supporting member.

A bent curvature is formed in the rear end of the car body frame to protrude upward in a predetermined height from the car body frame, and the rotation supporting member is rotatably mounted to the bent curvature.

The hinge shaft is disposed under the bent curvature.

The roll links may include a pair arranged on left and right side about the longitudinal axis of the car body frame, wherein the another end of the each roll link is pivotally connected to the roll connector and the end of the each roll link is connected through a ball joint to drop links which move up or down as the front wheels turn.

The each roll link is pivotally mounted to the car body frame through a portion of a mount component fixed to the car body frame, the portion of the mount component being spaced from the car body frame.

Each front wheel is rotatably mounted to an end of a lower arm, wherein each of the drop links is pivotally coupled to the end of the each roll link and to the lower arm, and wherein another end of lower arm is pivotally coupled to the car body frame.

In another aspect of the present invention, a rear suspension of a three-wheeled car with two front wheels and one rear wheel installed in a car body frame, may include roll links pivotally mounted to the car body frame, wherein an end of each roll link is connected to each front wheel respectively such that a twisting occurs to the roll links as the car turns, a roll connector, to which another end of the each roll link is pivotally connected, wherein the roll connector pivotally rotates about a longitudinal axis thereof, when the twisting of the roll links occurs, and a knuckle assembly pivotally coupled to the rear wheel and to a rear end of the car body frame, wherein the knuckle assembly is rotatably engaged to the roll connector through the rear end of the car body frame so that the knuckle assembly moves left and right with respect to the car body frame while the roll connector turns, wherein the knuckle assembly turns in the same direction as the front wheels turn and changes a toe angle and a camber angle of the rear wheel.

The rear suspension of the three-wheeled car may further include a link bar, a middle portion thereof being fixed to the roller connector and both ends thereof being pivotally coupled to the another end of each roll link.

The knuckle assembly may include a fork arm to which a rotation shaft of the rear wheel is rotatably mounted, a toe connector, pivotally coupled to the rear end of the car body frame such that the toe connector rotates left and right with respect to the car body frame to change the toe angle of the rear wheel, wherein the toe connector is rotatably engaged to an end of the roll connector through the rear end of the car body frame, and a camber connector pivotally connecting the fork arm and the toe connector through a hinge shaft, wherein the camber connector is pivotally connected to the rear end of the car body frame to induce change in the camber angle of the rear wheel as the fork arm turns left and right.

The roll connector is engaged to a roll shaft, wherein a first bevel gear is formed to an end of the roll shaft, wherein a second bevel gear, which meshes with the first bevel gear, is installed in an upper portion of the toe connector rotatably coupled to the rear end of the car body frame, and wherein a third bevel gear connected to the camber connector by penetrating a rear end of the toe connector, the third bevel gear being meshed with a guide gear formed in the rear end of the car body.

A bent curvature is formed in the rear end of the car body frame to protrude upward in a predetermined height from the car body frame, and the toe connector is rotatably mounted to the bent curvature.

The roll links may include a pair arranged on left and right side of the longitudinal axis in the car body frame, wherein the another end of the each roll link is pivotally connected to the roll connector and the end of the each roll link is connected through a ball joint to drop links which move up or down as the front wheels turn.

The each roll link is pivotally mounted to the car body frame through a portion of a mount component fixed to the car body frame, the portion of the mount component being spaced from the car body frame.

Each front wheel is rotatably mounted to an end of a lower arm, wherein each of drop links is pivotally coupled to the end of the each roll link and to the lower arm, and wherein another end of lower arm is pivotally coupled to the car body frame.

The rear suspension structure of the present invention as described above is a structure that induces toe-in in the rear wheel to induce under-steer of the car as the car turns, i.e. a structure in which the rear wheel turns in the same direction the front wheels turn, and therefore, it can prevent spin-outs and bring the anti-roll effect, which can enhance the stability when the car is turning.

In addition, a roll connector and a knuckle assembly have a structure where the rotating force is conveyed through a roll shaft, which makes it possible for the structure of the present invention to be applied regardless of how long the car body frame is.

The knuckle assembly can not only turn left and right but also up and down in connection with the damping strut not depicted in the drawings so it can buffer the impact coming from the ground, and also it can be installed in the curvature formed in the rear part of the car body frame so the height of the car body frame from the ground is smaller.

Also, a pair of the roll links is arranged in the left side and the right side of the car body frame respectively, and they are connected to each other by a ball joint so the roll connector can revolve around the shaft more efficiently.

The rear suspension structure of a second embodiment of the present invention is a structure in which the toe angle and the camber angle of the rear wheel change automatically to induce under-steer of the car as the car turns, and therefore, it can prevent spin-outs and enhance more efficiently the stability of the car when the car is turning.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
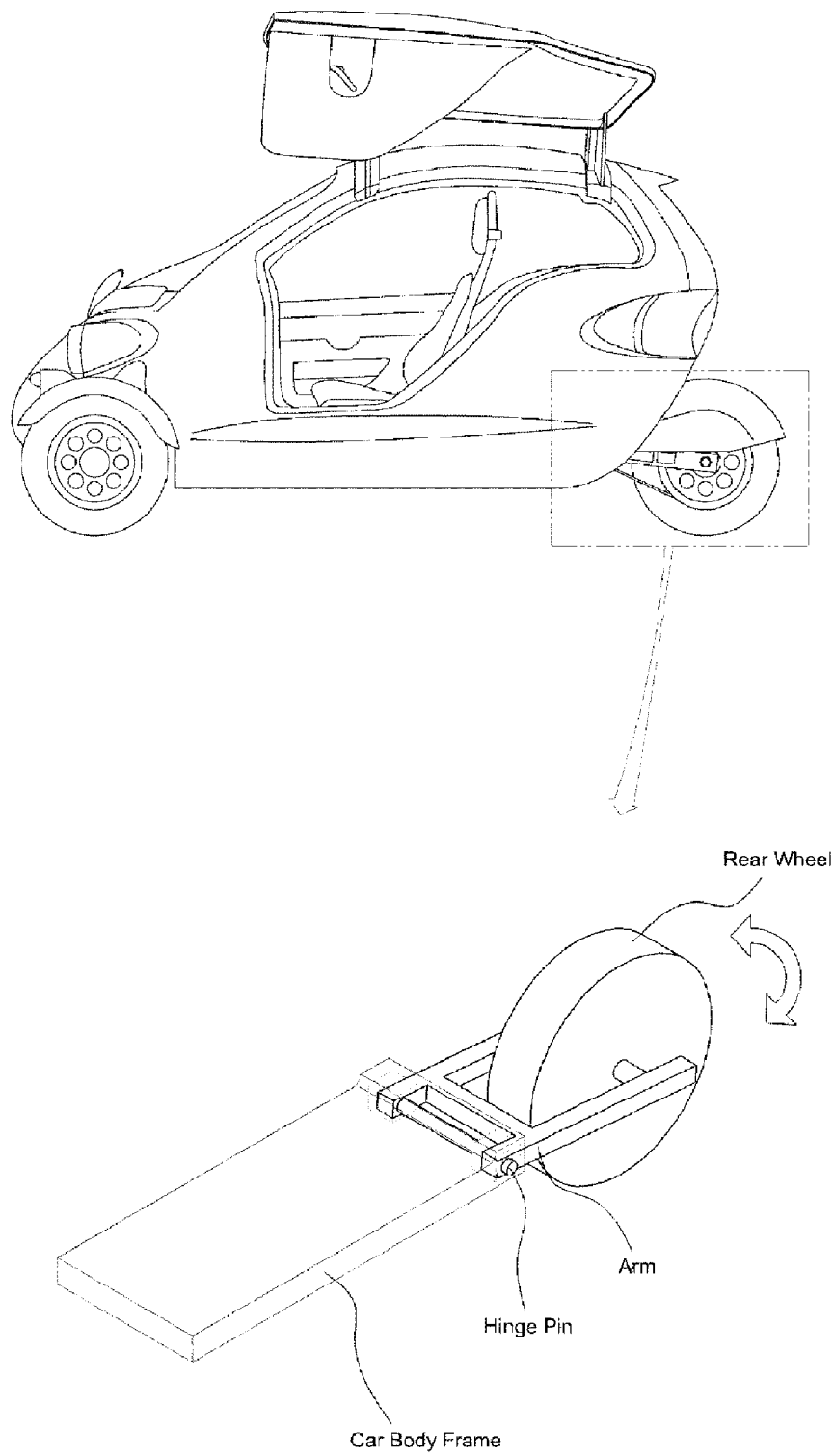
FIG. 1 is a drawing simplifying the look of a three-wheeled car with the traditional swing-arm type suspension, as well as the traditional swing-arm suspension itself.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereafter, with reference to the attached drawings, the preferred embodiment of the present invention will be described in detail. Before proceeding, it should be noted that the terminologies and words used on this specification and in the claims are not to be interpreted solely as the general or dictionary meanings, and they should be interpreted as the meanings and the concept which correspond with the technological ideas of the present invention based on the principle that the inventor can properly define the concept of the terminologies in order to explain his own invention in the best possible way. Therefore, the compositions described in the embodiments and the drawings of this specification are merely the most preferred types of embodiment and they do not represent the entire technological ideas of the present invention, and thus, it should be understood that there can be a variety of equivalents and alterations, which can replace these embodiments at the time of filing this application.

Figure 2:
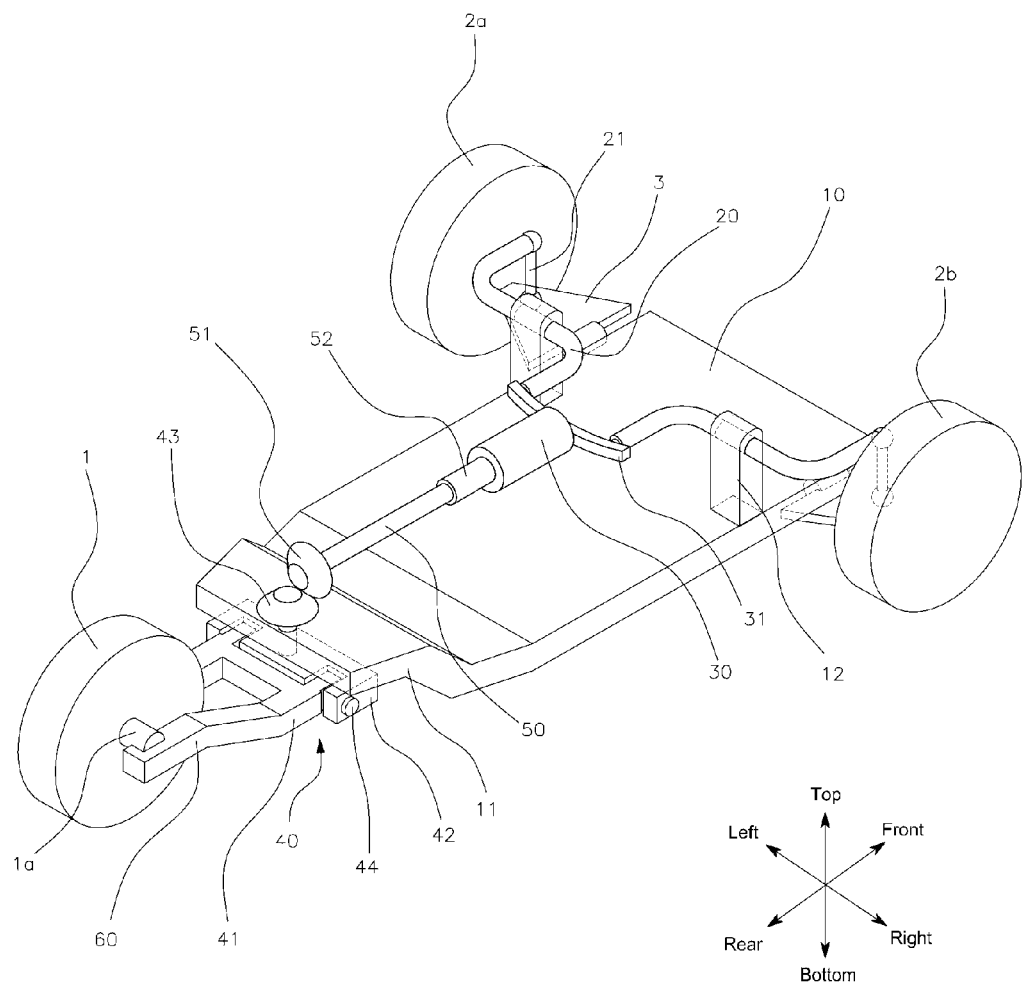
FIG. 2 is a perspective view simplifying a rear suspension of a three-wheeled car in accordance with various exemplary embodiments of the present invention.
Figure 3:
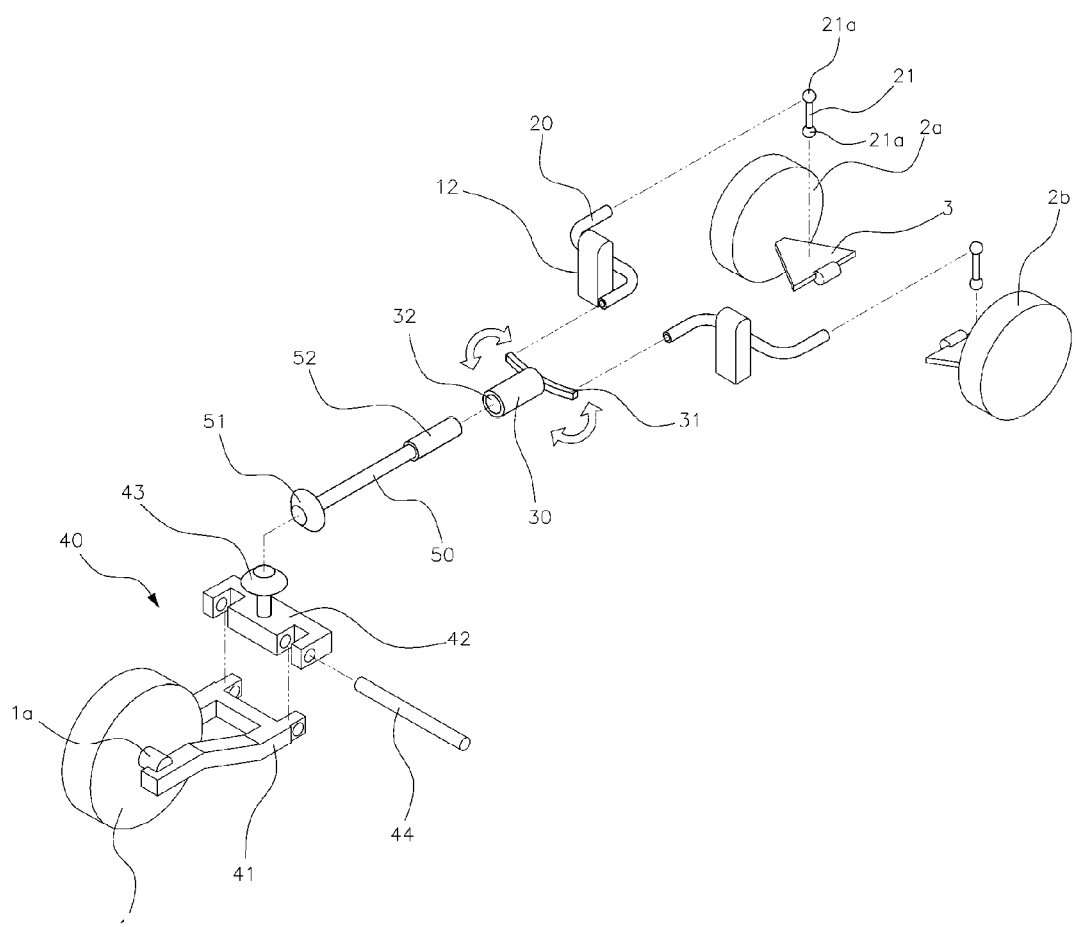
FIG. 3 is an exploded perspective view of FIG. 2.

In reference to FIG. 2 and FIG. 3, a car body frame 10, according to a first embodiment of the present invention, has a pre-determined area, and two front wheels 2a, 2b are installed in its front part, one on the left and the other on the right. Each of the front wheels 2a, 2b is connected to the car body frame 10 through a lower arm 3, which revolves up and down as the car turns.

In addition, each lower arm 3 is connected to a roll link 20 through a drop link 21. The roll link 20 is a bar with a bent shape of an "S" and is installed in a way that it can be twisted around the mount component 12 with the mount component 12 as a shaft. In other words, a roll link 20, which is installed in the mount component 12 and receives the force through a drop link 21, performs a twisting movement, in which, if one end of the roll link 20 connected to the drop link 21 moves downward, the other end moves upward, and if one end of the roll link 20 connected to the drop link 21 moves upward, the other end moves downward. The drop link 21 and the lower arm 20 are connected by a ball joint 21a.

The ends of the roll links 20, which are arranged on left and right side of the car, are connected by the roll connector 30. The roll connector 30 has a shape of a cylinder and is arranged so that it rotates along the longitude of the car body frame. Also, a link bar 31 is pivotally joined to the roll connector 30 so that the ends of the roll links 20 are connected. Therefore, the roll connector 30 rotates around a shaft pursuant to the twisting of the roll links 20.

Moreover, a roll shaft 50 is connected to the rear part of the roll connector 30.

The roll shaft 50 and the roll connector 30 are connected in a serration structure 52 for conveyance of the rotation force. In other words, in one end of the roll shaft 50 are protruding gear teeth, which are arranged along the outer circumference of the shaft, and on the roll connector 30 is arranged a fixing hole, which those gear teeth can be fit into. Also, on the end of the roll shaft 50 is installed a first bevel gear 51 so that the motive power can be conveyed onto a knuckle assembly 40, which is joined to a rear wheel 1 by a rotation shaft 1b.

The knuckle assembly 40 includes the combination of a fork arm 60 and a rotation supporting member 42. The fork arm 60 is H-shaped, and a rotating shaft of a rear wheel 1 is connected to its rear end. Also, the fork arm's front end 41 is joined to a rotation supporting member 42 through a hinge shaft 44 so that it can revolve up and down.

The rotation supporting member 42 is installed below a bent curvature 11, which protrudes upward from the rear end of the car body frame 10, and it penetrates the curvature 11 and is joined to a second bevel gear 43 in the upper part. The second bevel gear 43 meshes with a first bevel gear 51 and conveys the rotation force of a roll shaft to the rotation supporting member 42.

Figure 5:
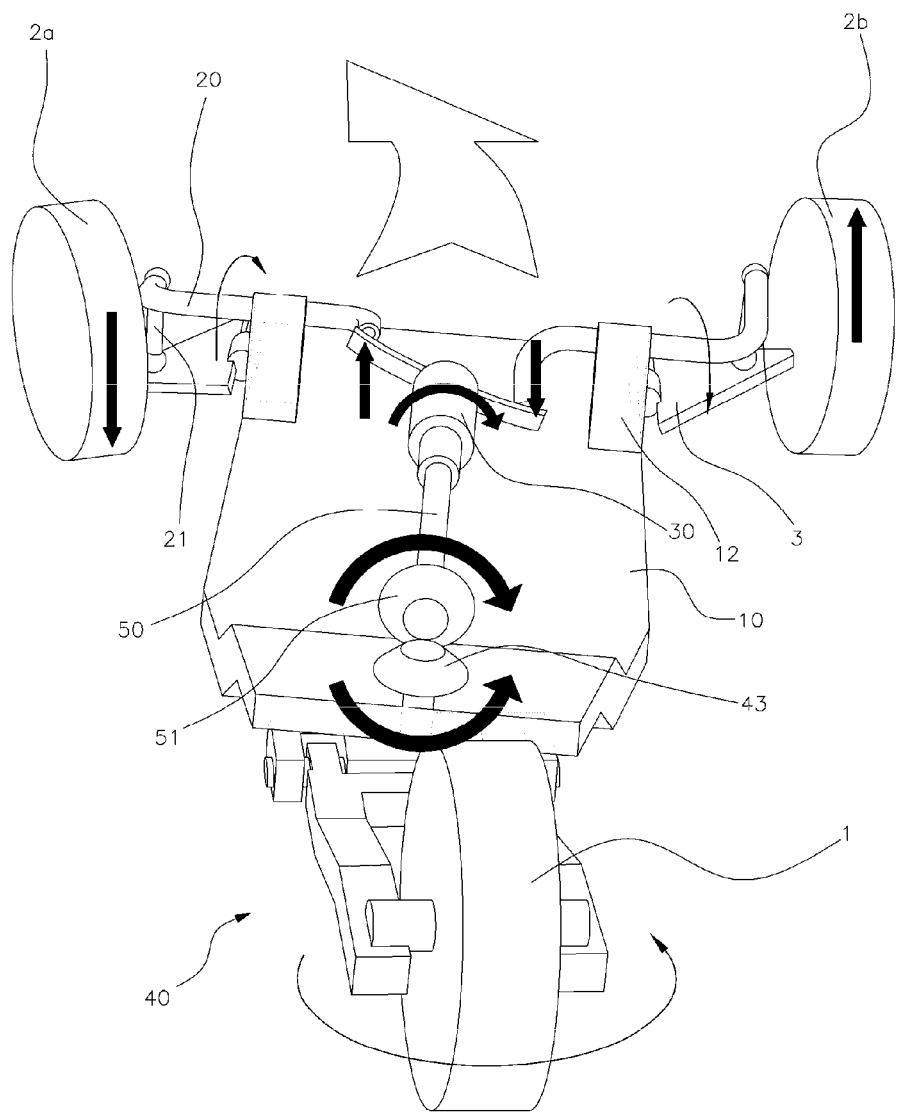
FIG. 5 is a perspective view of a three-wheeled car in operation while the car is turning left, with the rear suspension according to various exemplary embodiments of the present invention applied.

Therefore, the knuckle assembly 40 having the composition described above ends up rotating in the same direction the front wheels turn refer to the arrow in FIG. 5. In other words, the leaning of the car when the car is turning generates the twisting of roll links 20, and the twisting of roll links 20 rotates a roll connector 30, and the rotation force of a roll connector is conveyed to a knuckle assembly 40 through a roll shaft 50 so as to turn the rear wheel 1.

Figure 4:
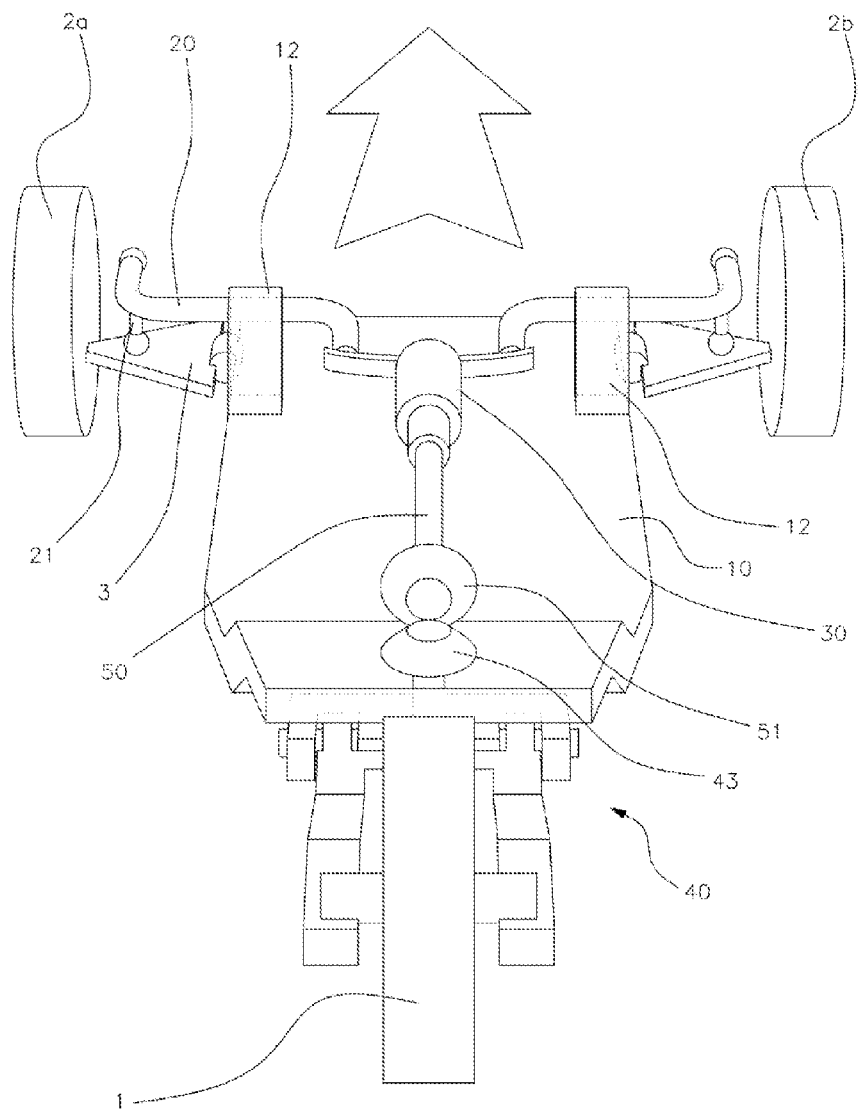
FIG. 4 is a perspective view of a three-wheeled car in operation while the car is moving straight forward, with the rear suspension according to various exemplary embodiments of the present invention applied.

Accordingly, as illustrated in FIG. 4, when the car is moving straight forward, twisting of roll links 20 will not occur and the rear wheel will not turn. On the other hand, if the car turns, the twisting of roll links 50, caused by the change in the center of the mass of the car, is transformed to the rotation force in the direction of the arrow in FIG. 5, which is then conveyed to a knuckle assembly 40 and turns the rear wheel 1.

For reference, in the exemplary embodiment of the present invention, the bevel gear and the serration gear are exemplified as the equipment that conveys motive-power but they can be modified as a rack gear, a worm gear or other link structures.

On top of that, how much the rear wheel turns can be decided by the design condition of the car through controlling the gear ratio of a first bevel gear and a second bevel gear. Also, separate link equipment or gear equipment, which can increase or decrease the rotation speed of a roll connector as roll links twist, can be added.

Figure 6:
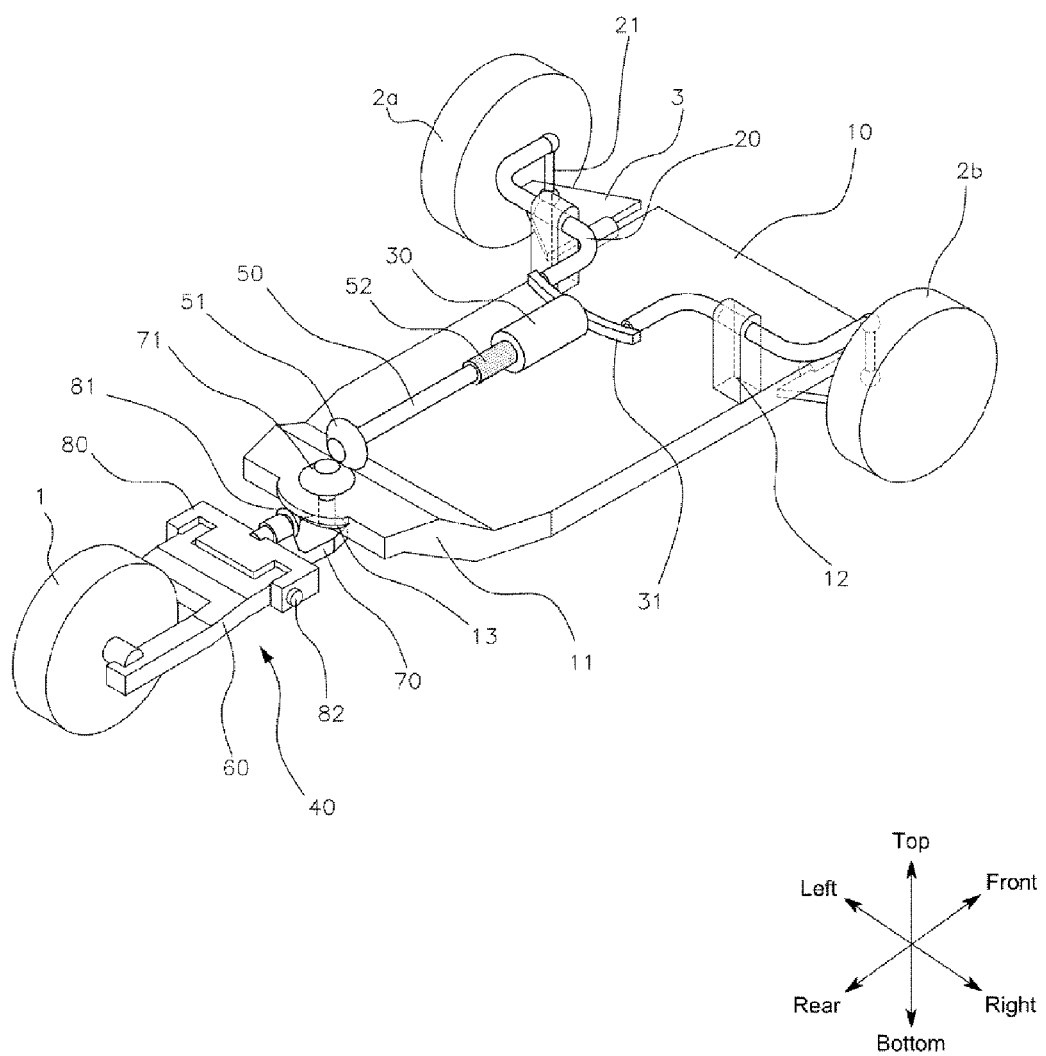
FIG. 6 is a perspective view simplifying a rear suspension of a three-wheeled car in accordance with various exemplary embodiments of the present invention.
Figure 7:
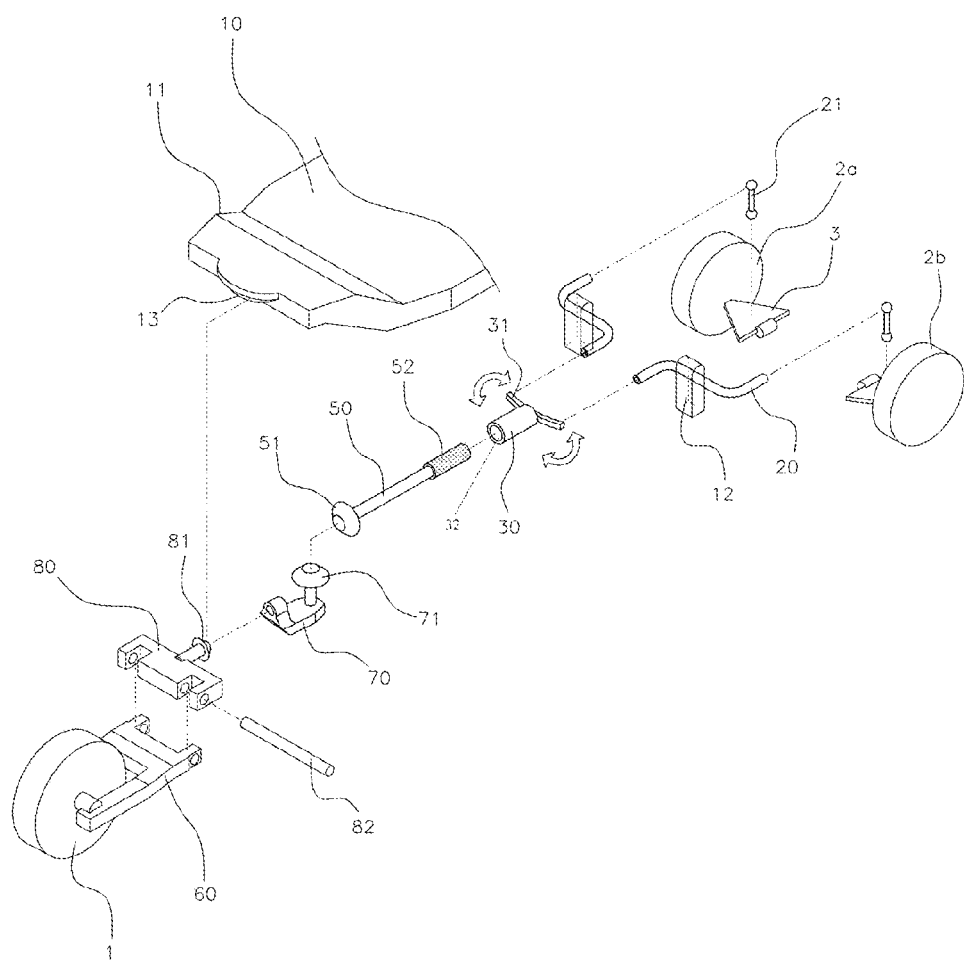
FIG. 7 is an exploded perspective view of FIG. 6.

In reference to FIG. 6 and FIG. 7, a car body frame 10, according to a second embodiment of the present invention, has a pre-determined area, and two front wheels 2a, 2b are installed in its front part, one on the left and the other on the right. Each of the front wheels 2a, 2b is connected to the car body frame 10 through a lower arm 3, which revolves up and down as the car turns.

As in a first embodiment, each lower arm 3 is connected to a roll link 20 through a drop link 21. The roll link 20 is a bar with a bent shape of an "S" and is installed in a way that it can be twisted around the mount component 12 with the mount component as a shaft.

A knuckle assembly 40 is installed in the rear end of the car body frame 10 in a way that it rotates in the same direction the front wheels 2a, 2b turn and changes the toe angle, but as it changes the toe angle, it rotates around a shaft and changes the camber angle of the rear wheel as well.

The knuckle assembly 40 includes a combination of a fork arm 60, a toe connector 70 and a camber connector 80. The fork arm 60 is H-shaped as the fork arm of a first embodiment is, and a rotating shaft of a rear wheel 1 is connected to its rear end. Also, a front end of the fork arm 60 is joined to a camber connector 80 through a hinge shaft 82 so that it can pivot up and down.

In an exemplary embodiment of the present invention, an elastic member may be installed at the fork arm 60 and the camber connector 80 around the hinge shaft 82 to bias the fork arm 60 downwards so as to support the camber connector 80 upwards.

The camber connector 80 is connected to the rear end of the car body frame 10 through a toe connector 70. The toe connector 70 is installed in the rear end of the car body frame 10 in a way that it can rotate left and right so as to change the toe angle of the rear wheel 1. The camber connector 80 connects a fork arm 60 and a toe connector 70, and is geared to the rear end of the car body frame 10 so that the fork arm 60 rotates around a shaft and induces a change in the camber angle of the rear wheel 1 as the fork arm 60 turns left and right.

Figure 8:
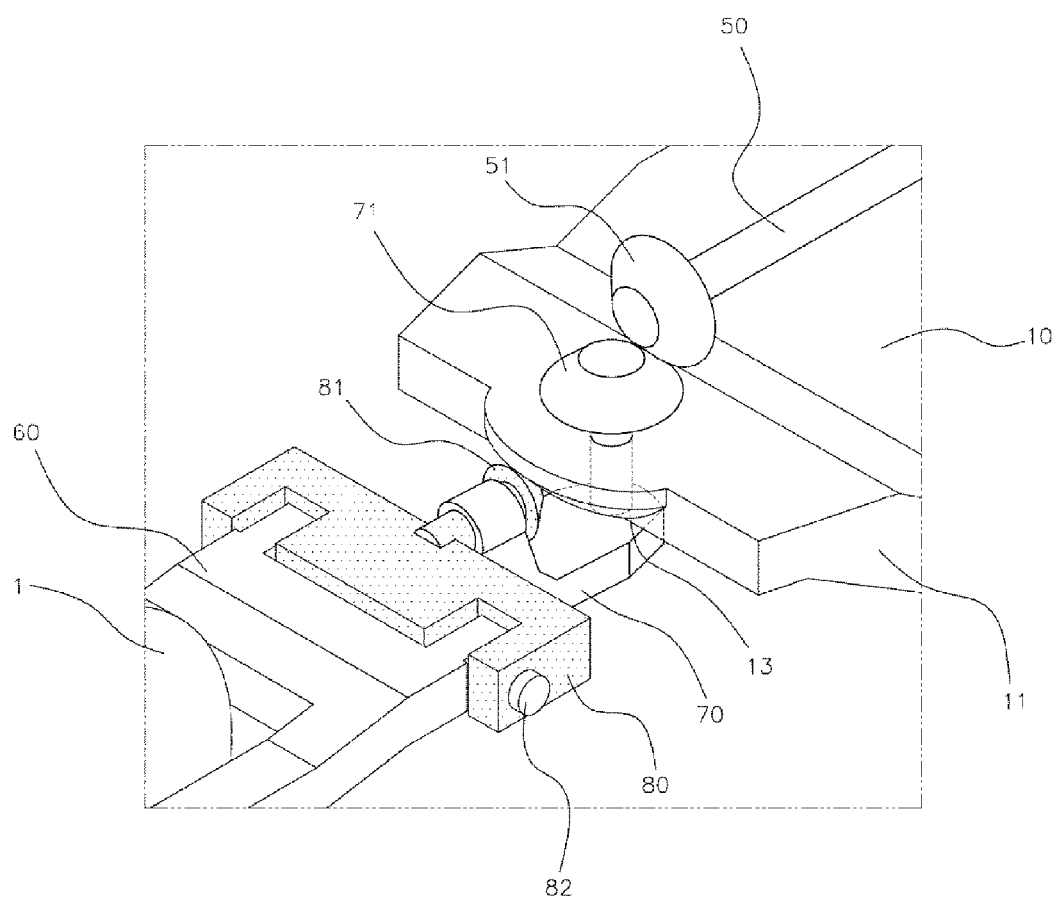
FIG. 8 is a perspective view illustrating a toe connector and a camber connector of the present invention, connected to the car body frame.
Figure 9:
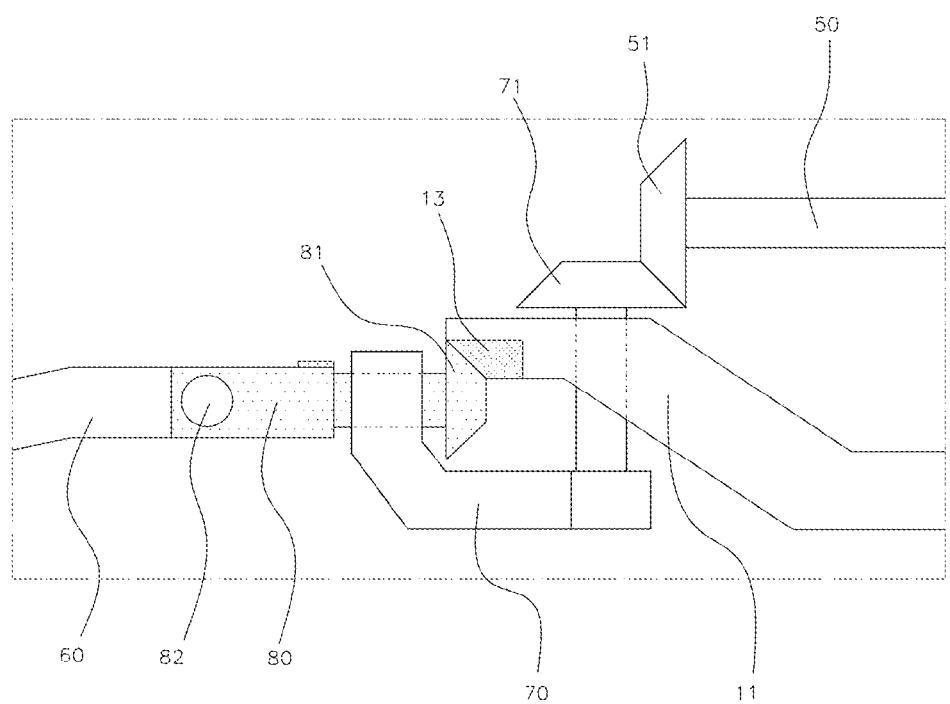
FIG. 9 is a side view illustrating a toe connector and a camber connector of the present invention, connected to the car body frame.

As illustrated in FIG. 8 and FIG. 9, a first bevel gear 51 is arranged in the rear end of the roll shaft 50 which is connected to the roll connector 30, and the first bevel gear 51 meshes with a second bevel gear 71 protruding from a toe connector 70. Therefore, the second bevel gear 71 is connected to the car body frame 10 in a way that it can rotate left and right. Also, a third bevel gear 81 protrudes in the front end of a camber connector 80, and the rear end of a toe connector 70 is bent upward so that the a third bevel gear 81 is connected to it in a way that the third bevel gear can penetrate it and rotate around a shaft. The third bevel gear is connected to the car body frame 10 in a way that it meshes with a guide gear 13, which is shaped as a half-circle and formed in the rear end of the car body frame 10.

The toe connector 70 is installed below the bent curvature 11 which is formed in the rear end of the car body frame 10 and protrudes upward.

Therefore, the knuckle assembly having the composition described above changes the toe angle of the rear wheel 2 in the same direction the front wheels 2a, 2b turn, and changes the camber angle so that the rear wheel leans towards the opposite direction the car body frame 10 twists refer to the direction of the arrow in FIG. 7.

In other words, the leaning of the car body frame according to the centrifugal force when the car is turning generates the twisting of roll links 20, and the twisting of the roll links 20 rotates a roll connector 30, and the rotation force of the roll connector 30 is conveyed to a toe connector 70 of a knuckle assembly through a roll shaft 50 and changes the toe angle, wherein, a camber connector 80 rotates around a shaft as a toe connector 70 rotates, changing the camber angle of the rear wheel 1.

Figure 10:
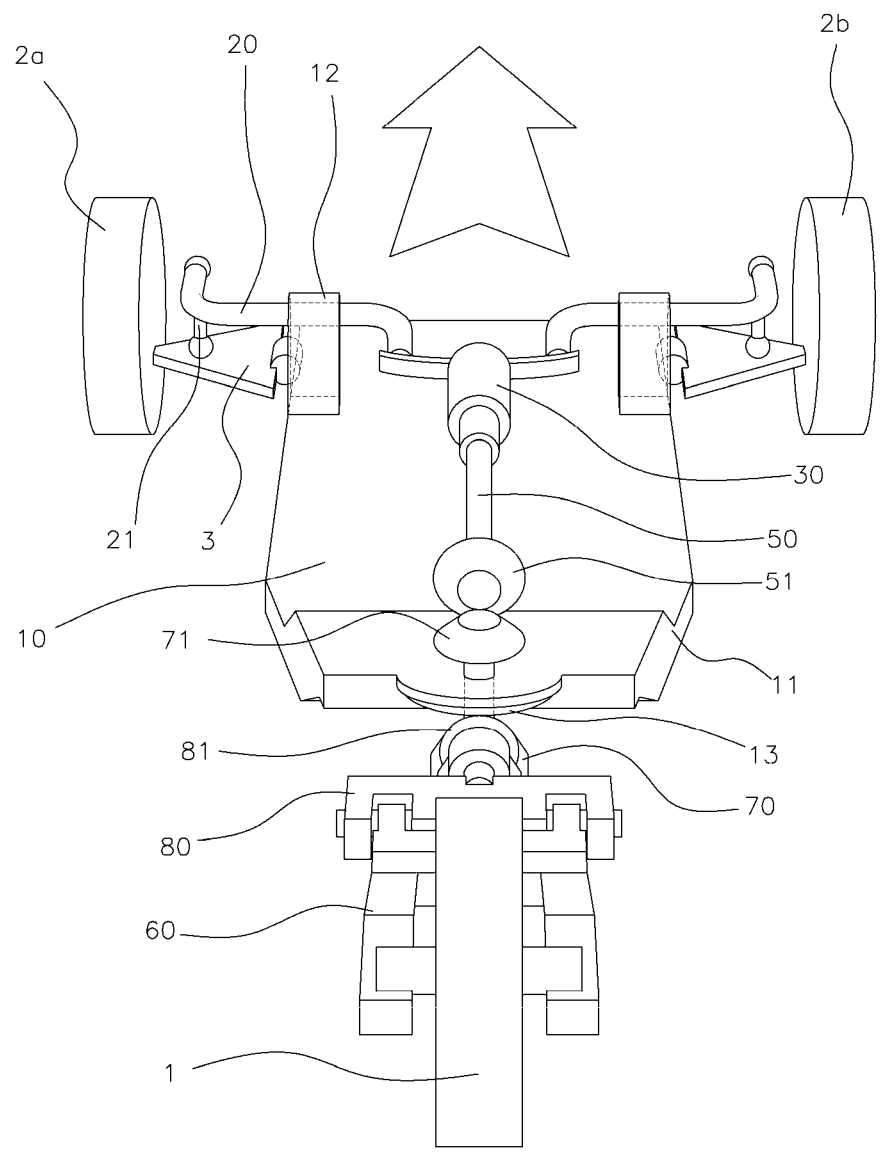
FIG. 10 is a perspective view illustrating the operation of a three-wheeled vehicle with a rear suspension of the present invention applied when it is moving straight forward.
Figure 11:
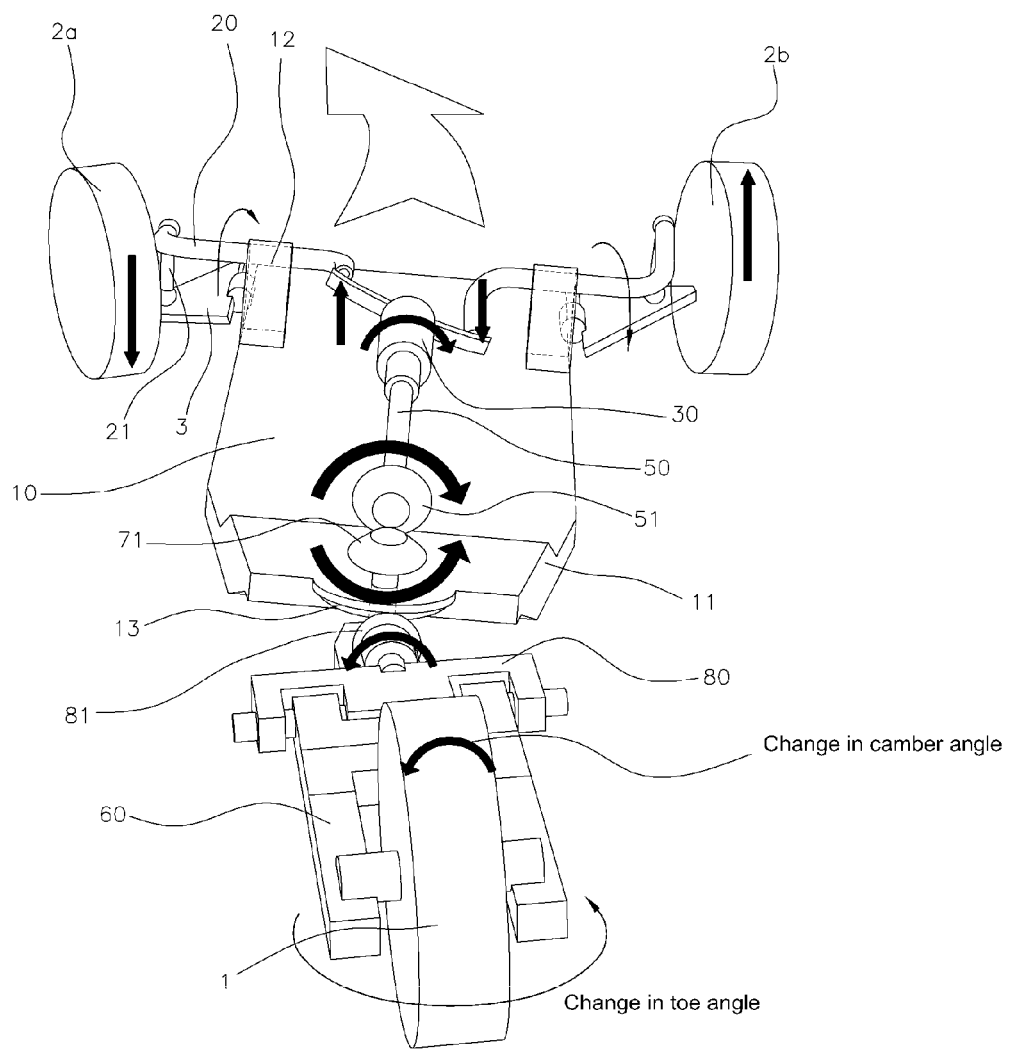
FIG. 11 is a perspective view illustrating the operation of a three-wheeled vehicle with a rear suspension of the present invention applied when it is turning left.

Hence, as illustrated in FIG. 10, the twisting of roll links does not occur when the car is moving straight forward, so the toe angle and the camber angle of the rear wheel 1 do not change. On the other hand, if the car turns, the twisting of roll links 50, caused by the change in the center of the mass of the car, is transformed to the rotation force in the direction of the arrow in FIG. 5, which is then conveyed to a knuckle assembly 40 composed of a toe connector 70 and a camber connector 80 and changes the toe angle and the camber angle of the rear wheel 1.

For reference, in the exemplary embodiment of the present invention, the bevel gear and the serration gear are exemplified as the equipment that conveys motive-power, but they can be modified as a rack gear, a worm gear or other link structures.

On top of that, how much the rear wheel turns can be decided by the design condition of the car, by controlling the gear ratio of a first bevel gear and a second bevel gear as well as the gear ratio of a third bevel gear 81 and a guide gear 13. Also, separate link equipment or gear equipment, which can increase or decrease the rotation speed of a roll connector as roll links twist, can be added.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear suspension of a three-wheeled car with two front wheels and one rear wheel installed in a car body frame, comprising:
   roll links pivotally mounted to the car body frame, wherein an end of each roll link is connected to each front wheel respectively, such that a twisting occurs to the roll links as the car turns;
   a roll connector, to which another end of the each roll link is pivotally connected, wherein the roll connector pivotally rotates about a longitudinal axis thereof, when the twisting of the roll links occurs;
   a knuckle assembly pivotally coupled to the rear wheel and to a rear end of the car body frame, wherein the knuckle assembly is rotatably engaged to the roll connector through the rear end of the car body frame so that the knuckle assembly moves left and right with respect to the car body frame while the roll connector turns; and
   a link bar, a middle portion thereof being fixed to the roller connector and both ends thereof being pivotally coupled to the another end of each roll link;
   wherein the knuckle assembly turns in the same direction as the front wheels turn.

2. A rear suspension of a three-wheeled car with two front wheels and one rear wheel installed in a car body frame, comprising:
   roll links pivotally mounted to the car body frame, wherein an end of each roll link is connected to each front wheel respectively, such that a twisting occurs to the roll links as the car turns;
   a roll connector, to which another end of the each roll link is pivotally connected, wherein the roll connector pivotally rotates about a longitudinal axis thereof, when the twisting of the roll links occurs; and a knuckle assembly pivotally coupled to the rear wheel and to a rear end of the car body frame, wherein the knuckle assembly is rotatably engaged to the roll connector through the rear end of the car body frame so that the knuckle assembly moves left and right with respect to the car body frame while the roll connector turns;

wherein the knuckle assembly turns in the same direction as the front wheels turn;

wherein the roll connector is engaged to a roll shaft;

wherein a first bevel gear is formed to an end of the roll shaft; and wherein a second bevel gear, which meshes with the first bevel gear, is installed in an upper portion of the knuckle assembly that is rotatably coupled to the car body frame.

3. The rear suspension of the three-wheeled car according to claim 2, wherein the knuckle assembly includes:

a fork arm, to which a rotation shaft of the rear wheel is rotatably mounted; and a rotation supporting member pivotally mounted to the rear end of the car body frame such that the rotation supporting member turns left or right, wherein an end of the fork arm is pivotally joined to the rotation supporting member through a hinge shaft so that the fork arm pivots around the hinge shaft; and wherein the second bevel gear is formed to an upper portion of the rotation supporting member.

4. The rear suspension of the three-wheeled car according to claim 3, wherein a bent curvature is formed in the rear end of the car body frame to protrude upward in a predetermined height from the car body frame, and the rotation supporting member is rotatably mounted to the bent curvature.

5. The rear suspension of the three-wheeled car according to claim 4, wherein the hinge shaft is disposed under the bent curvature.

6. A rear suspension of a three-wheeled car with two front wheels and one rear wheel installed in a car body frame, comprising:

roll links pivotally mounted to the car body frame, wherein an end of each roll link is connected to each front wheel respectively, such that a twisting occurs to the roll links as the car turns;

a roll connector, to which another end of the each roll link is pivotally connected, wherein the roll connector pivotally rotates about a longitudinal axis thereof, when the twisting of the roll links occurs; and a knuckle assembly pivotally coupled to the rear wheel and to a rear end of the car body frame, wherein the knuckle assembly is rotatably engaged to the roll connector through the rear end of the car body frame so that the knuckle assembly moves left and right with respect to the car body frame while the roll connector turns;

wherein the knuckle assembly turns in the same direction as the front wheels turn;

wherein the roll links include a pair arranged on left and right side about the longitudinal axis of the car body frame, and wherein the another end of the each roll link is pivotally connected to the roll connector and the end of the each roll link is connected through a ball joint to drop links which move up or down as the front wheels turn.

7. The rear suspension of the three-wheeled car, according to claim 6, wherein the each roll link is pivotally mounted to the car body frame through a portion of a mount component fixed to the car body frame, the portion of the mount component being spaced from the car body frame.

8. The rear suspension of the three-wheeled car, according to claim 6, wherein each front wheel is rotatably mounted to an end of a lower arm, wherein each of the drop links is pivotally coupled to the end of the each roll link and to the lower arm; and wherein another end of lower arm is pivotally coupled to the car body frame.

* * * * *